(12) United States Patent
DiLellio et al.

(10) Patent No.: US 7,969,352 B2
(45) Date of Patent: Jun. 28, 2011

(54) GLOBAL POSITIONING SYSTEM ACCURACY ENHANCEMENT

(75) Inventors: James A. DiLellio, Irvine, CA (US); Edward Carolipio, Bellflower, CA (US); Jya-Syin Wu Chien, Tustin, CA (US); Kamran Ghassaei, Orange, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/341,158

(22) Filed: Dec. 22, 2008

(65) Prior Publication Data

US 2009/0174597 A1 Jul. 9, 2009

Related U.S. Application Data

(60) Provisional application No. 61/019,709, filed on Jan. 8, 2008.

(51) Int. Cl.
*G01S 19/41* (2010.01)
(52) U.S. Cl. .................................. 342/357.24
(58) Field of Classification Search .................. 342/354, 342/357.23, 357.24, 357.44, 357.47
See application file for complete search history.

(56) References Cited

U.S. PATENT DOCUMENTS

| 5,589,834 A | * | 12/1996 | Weinberg | 342/354 |
| 6,373,432 B1 | | 4/2002 | Rabinowitz et al. | |
| 7,535,402 B1 | * | 5/2009 | Lawrence et al. | 342/20 |
| 2005/0159891 A1 | | 7/2005 | Clark et al. | |

FOREIGN PATENT DOCUMENTS

WO WO 01/24408 A3 4/2001

OTHER PUBLICATIONS

International Search Report and the Written Opinion dated May 27, 2009; 15 pages.
British Telecommunication PLC, 1991. Chapter 4, "FPLMTS Space Segment," Article No. XP-002526846, pp. 36-47; 12 pages.

* cited by examiner

*Primary Examiner* — Dao L Phan
(74) *Attorney, Agent, or Firm* — Hope Baldauff Hartman, LLC

(57) ABSTRACT

Methods and systems enhance the accuracy of the global positioning system (GPS) using a low earth orbiting (LEO) satellite constellation. According to embodiments described herein, GPS data is received from GPS satellites at a GPS control segment and is used to create GPS correction data to be utilized by user equipment to correct errors within the GPS data. The GPS correction data is transmitted from the GPS control segment to a LEO ground segment, where it is uplinked to the LEO satellite constellation. To account for bandwidth constraints and minimize any performance degradation of the LEO satellites, the GPS correction data is broadcast to earth on a subset of the total number of available spot beams. The subset of spot beams is selected in part according to satellite angular velocity, bandwidth constraints, and message latency estimates.

20 Claims, 8 Drawing Sheets

GLOBAL POSITIONING SYSTEM ACCURACY ENHANCEMENT

CROSS-REFERENCE TO RELATED APPLICATIONS

This patent application is a non-provisional patent application of U.S. Provisional Patent Application Ser. No. 61/109,709 entitled "Global Positioning System Accuracy Enhancement," filed Jan. 8, 2008, which is incorporated herein by reference in its entirety.

TECHNICAL FIELD

The present disclosure relates generally to global positioning system (GPS) accuracy, and more particularly to enhancing the accuracy of a GPS system using a low earth orbiting (LEO) satellite constellation.

BACKGROUND

GPS technology utilizes a constellation of orbiting satellites that transmit data to GPS receivers on earth. The GPS receivers use the data received from three or more satellites to determine location, speed, direction, and time. The GPS data transmitted by the GPS satellites includes atomic clock and satellite ephemeris data that is important to the accurate determination of the position and other navigational information corresponding to a GPS receiver that may be incorporated into any number of types of user equipment. However, this data, as well other data transmitted by the GPS satellites, is subject to various types of errors that can affect the precise determination of the position of a GPS receiver as well as any other navigation solution. As a result, the atomic clock and ephemeris data is estimated and uploaded to the GPS satellite approximately once per day. This correction data is used to compensate for the errors in the GPS data sent to the GPS receivers on the ground.

A disadvantage of relying on these daily uploads is that the errors inherent in the broadcast message from the GPS satellites grows proportional to the time from the latest upload and include a residual component relative to the ability of the GPS control segment on the ground to estimate these uploaded parameters. The latency associated with the clock and ephemeris estimates generated by the GPS control segment is created due in part to telemetry, tracking, and control (TTC) aspects of the GPS. For example, the TTC aspects of the GPS are characterized by a limited number of ground antennas, TTC bandwidth limitations, large upload data size requirements for any potential autonomous operations, and limitations associated with human control of the TTC system.

There are several techniques currently employed to minimize the errors associated with the GPS data transmitted from the GPS satellite constellation. However, these systems do not provide adequate correction data with adequate frequency to user equipment around the world. As a result, user equipment remains subjected to errors in the GPS data to an extent that prevents accurate and precise calculation of navigation solutions.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods and systems described herein provide for GPS augmentation utilizing a LEO satellite constellation. By utilizing a LEO satellite constellation in the manners described below, GPS correction data can be disseminated worldwide in a timely manner and used to reduce the errors inherent in the GPS data received from the GPS satellites. As a result, the accuracy of the navigation solutions calculated by user equipment receiving the GPS data and the GPS correction data is significantly enhanced. To utilize the LEO satellite constellation for broadcasting the GPS correction data without compromising the performance of the LEO satellites with respect to unrelated broadcast duties, the GPS correction data is broadcast in messages utilizing only a subset of the total number of available spot beams for each LEO satellite. The subset of spot beams is calculated utilizing a number of factors, including but not limited to, satellite angular velocity, bandwidth constraints, and message latency estimates.

According to embodiments described herein, a method for providing GPS correction data to user equipment includes receiving the GPS correction data. A subset of spot beams to be used to transmit the GPS correction data to earth is then determined for a LEO satellite. The subset of spot beams is selected to maximize a swath width of the footprint of the subset of spot beams on the earth. After selecting the subset of spot beams, these spot beams are used to broadcast the GPS correction data to earth.

According to further embodiments, a system providing GPS correction data to user equipment includes a memory and a processor. The memory stores a program with instructions that allow the processor to receive GPS correction data, to determine a subset of spot beams corresponding to a LEO satellite to be used to broadcast the GPS data to earth, and to broadcast the GPS correction data in the subset of spot beams. The subset of spot beams provides a maximum swath width of the footprint of the subset of spot beams on the earth.

According to other embodiments disclosed herein, a system includes a ground segment and a number of LEO satellites. The ground segment receives GPS correction data and uploads the data to a number of LEO satellites. The LEO satellites receive the upload of GPS data, determine a subset of spot beams for broadcasting the GPS correction data to earth, and then broadcast the data in the subset of spot beams for use by receiving equipment on the ground. According to further implementations, each LEO satellite estimates the time it will take to broadcast the message according to various message and satellite parameters, and uses this estimate along with the angular velocity of the satellite to select the subset of spot beams.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to methods and systems for augmenting the GPS to enhance accuracy. As discussed briefly above, GPS data broadcasted by the GPS satellite constellation is subject to errors that increase proportionally with the time from the last upload to the GPS satellites, or space vehicles, from the GPS control segment on the earth. To mitigate the error growth, and consequently increase the accuracy of the navigational position determinations made by the user equipment receiving GPS data from the GPS satellite constellation, the embodiments described below utilize a constellation of LEO space vehicles to relay GPS correction data to user equipment.

The user equipment may then utilize the GPS correction data received from the LEO space vehicle and the received GPS data from the GPS space vehicles to calculate position and other navigational data. Because embodiments described below utilize an existing constellation of LEO space vehicles that have existing broadcasting responsibilities, embodiments provided herein select and utilize a subset of the spot beams transmitted from the LEO space vehicles to broadcast the GPS correction data. By doing so, existing equipment may be used to significantly enhance the accuracy of position and other navigational data calculations made by user equipment. Additionally, the use of LEO space vehicles instead of a geosynchronous space vehicle provides additional opportunities to establish line-of-sight communications with the space vehicles as they traverse the sky, as opposed to situations in which the line-of-sight communication path with a geosynchronous space vehicle is continuously blocked by facilities or terrain.

Figure 1:
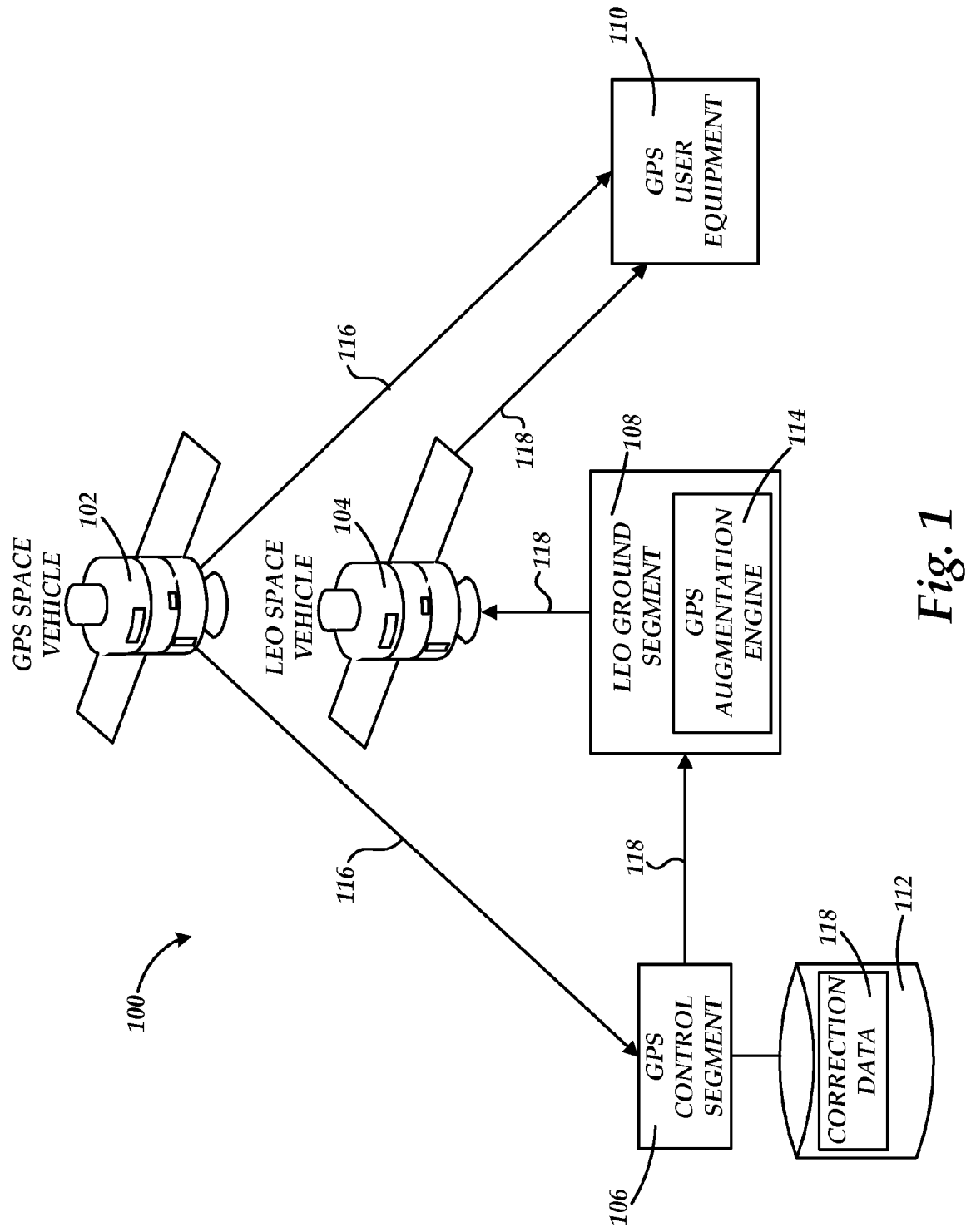
FIG. 1 is a block diagram of a GPS augmentation system according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, aspects of a GPS augmentation system will be described. FIG. 1 shows a GPS augmentation system 100 according to embodiments provided herein and will be utilized to present an overview of the various embodiments described in detail below with respect to FIGS. 2-8. The GPS augmentation system 100 includes a number of GPS space vehicles 102, a number of LEO space vehicles 104, a GPS control segment 106, and a LEO ground segment 108 for providing GPS data 116 and GPS correction data 118 to GPS user equipment 110. For clarity purposes, the GPS constellation of space vehicles is represented in FIG. 1 by a single GPS space vehicle 102. Similarly, the LEO constellation of space vehicles is represented by a single LEO space vehicle 104. However, it should be appreciated that the GPS constellation of space vehicles and the LEO constellation of space vehicles may include any number of space vehicles 102 and 104, respectively.

As stated above, the LEO space vehicle 104 may be one of any number of low earth orbiting satellites. According to various embodiments described herein, the LEO space vehicle 104 is a satellite that is part of the IRIDIUM satellite constellation, which is an existing LEO satellite constellation that provides worldwide data and voice telecommunication capabilities to satellite telephones. The IRIDIUM satellite constellation utilizes approximately 76 satellites that orbit pole to pole, completing an orbit in approximately 100 minutes. The IRIDIUM space vehicles are additionally capable of intersatellite communication, a feature that the embodiments described herein take advantage of in order to disseminate GPS correction data 118 among the constellation and down to the GPS user equipment 110. Although the embodiments described below may be discussed with respect to the IRIDIUM satellite constellation, it should be understood that any LEO constellation may be utilized without departing from the scope of this disclosure.

The GPS control segment 106 includes one or more ground facilities within the GPS augmentation system 100 that receive the GPS data 116 from the GPS space vehicles 102 and create the GPS correction data 118. The GPS correction data 118 may be stored within the GPS control segment 106, or in a database 112 or other memory or data repository that is directly or remotely connected to the GPS control segment 106. According to various embodiments, the GPS correction data 118 includes ephemeris and clock corrections, although any type of correction data may be disseminated to correct for any type of errors within the GPS data 116. The GPS control segment 106 forwards the GPS correction data 118 to the LEO ground segment 108 for transmission to the LEO space vehicles 104. The LEO space vehicles 104 then transmit the GPS correction data 118 to the GPS user equipment 110. However, because according to various embodiments, the LEO space vehicles 104 are tasked primarily with other telecommunications broadcasting responsibilities, the GPS augmentation engine 114 receives the GPS correction data 118 and determines the proper communication parameters for transmitting the GPS correction data 118 from the LEO space vehicle 104 to the GPS user equipment 110.

The GPS augmentation engine 114 may be hardware and/or software that is operative to direct the transmittal of the GPS correction data 118 from the LEO space vehicles 104 to the GPS user equipment 110 in the various manners described below. While the GPS augmentation engine 114 is shown to be executing as part of the LEO ground segment 108, the GPS augmentation engine 114 may alternatively reside at the LEO space vehicles 104 or operate in part at both locations. The GPS augmentation engine 114 may operate according to preprogrammed logic or according to direct user input and control. The operations of the GPS augmentation engine 114 will be described in further detail below. The GPS user equipment may include any type of GPS receiver capable of receiving the GPS data 116 from the GPS space vehicles 102 and of receiving the GPS correction data 118 from the LEO space vehicle 104. According to one embodiment, the GPS data 116 and the GPS correction data 118 are transmitted on similar but distinct frequencies to allow the GPS user equipment to utilize a single antenna for receiving transmissions from the GPS space vehicles 102 and from the LEO space vehicles 104.

Figure 2:
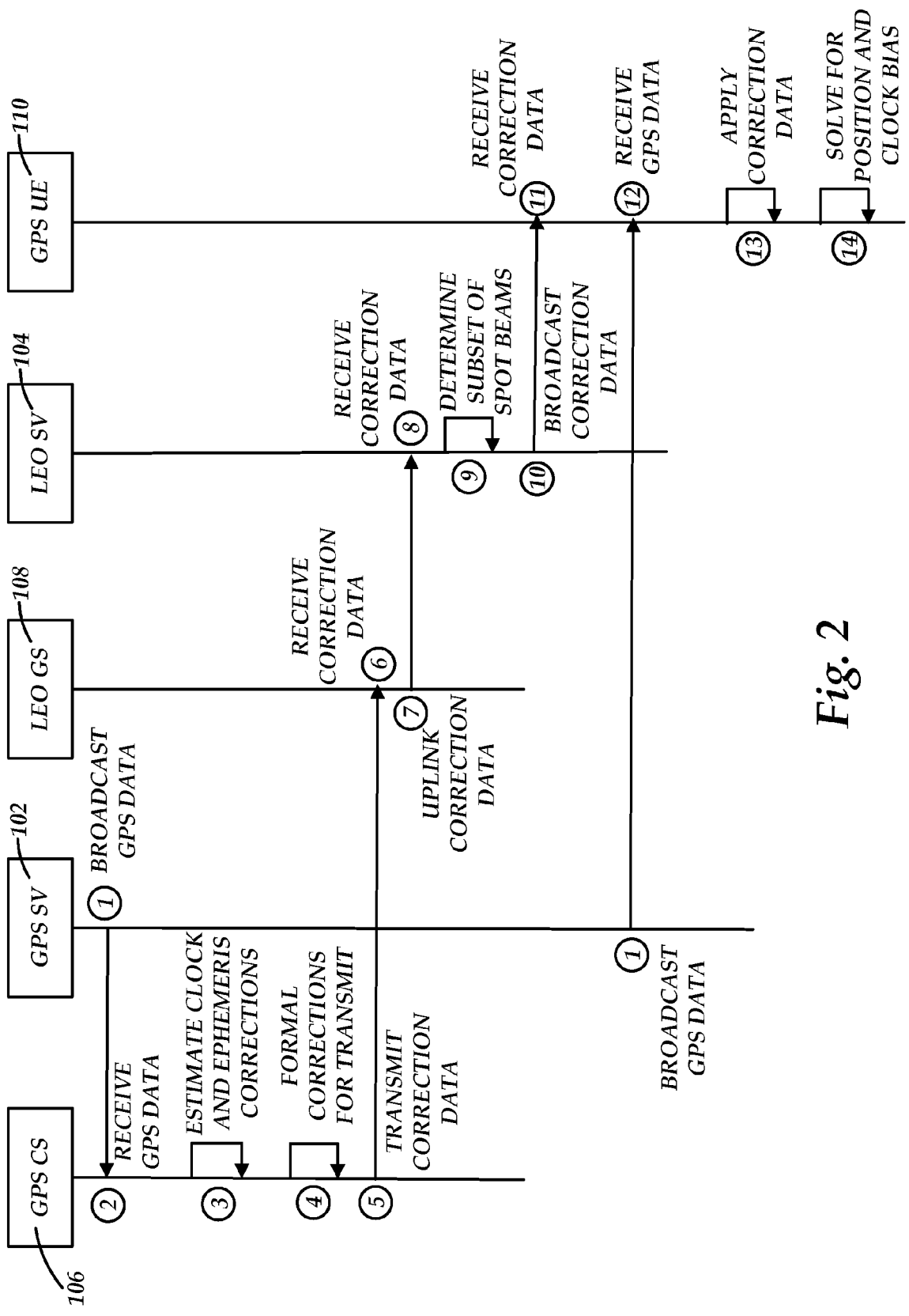
FIG. 2 is a block diagram illustrating actions taken by various elements of a GPS augmentation system according to various embodiments presented herein.

Turning now to FIG. 2, various actions taken by the elements of the GPS augmentation system 100 to provide GPS correction data 118 to the GPS user equipment 110 according to various embodiments presented herein will now be described. For illustrative purposes, the actions performed by the various elements of the GPS augmentation system 100 have been numbered in FIG. 2 and described as "events," and will be discussed sequentially. It should be apparent in the following discussion that various events may be performed in various sequences, including simultaneously, and are not limited to the sequential order in which they are numbered and discussed. Event 1 occurs when the GPS space vehicles 102 broadcast the GPS data 116 to the earth. The GPS data 116 is typically broadcast continuously over L1 and L2 frequencies. At Event 2, the GPS control segment 106 monitors and receives the GPS data 116 from the GPS space vehicles 102. The GPS control segment 106 utilizes this GPS data 116 and known error correction calculation techniques to estimate clock and ephemeris corrections and create the GPS correction data 118 at Event 3. The GPS correction data 118 is formatted for transmission to the LEO ground segment 108 at Event 4 and is transmitted to the LEO ground segment 108 at Event 5.

It should be appreciated that formatting the GPS correction data 118 for transmission may include formatting the GPS correction data 118 according to the particular transmission medium between the GPS control segment 106 and the LEO ground segment 108 and/or formatting the GPS correction data 118 for transmission to or from the LEO space vehicles 104. It should be further understood that the GPS correction data 118 estimation and formatting may occur at the LEO ground segment 108 instead of at the GPS control segment 106. In this alternative embodiment, the LEO ground segment 108 may directly receive the GPS data 116 from the GPS space vehicles 102 or may receive the GPS data 116 from the GPS control segment 106.

At Event 6, the LEO ground segment 108 receives the GPS correction data 118 from the GPS control segment 106 and uplinks the GPS correction data 118 to the LEO space vehicles 104 at Event 7. According to one implementation, the GPS correction data 118 is estimated and uploaded to the LEO space vehicles 104 at least every 15 minutes. Although the GPS correction data 118 may be estimated and uploaded to the LEO space vehicles 104 at any time interval, the shorter the interval between re-calculated estimates, the more accurate the position and other navigational data determined by the GPS user equipment 110 will be. According to various embodiments, the uploading of the GPS correction data 118 occurs via a secure gateway. For example, one embodiment that utilizes the IRIDIUM satellite constellation as the LEO space vehicles 104 uploads the GPS correction data 118 to the IRIDIUM satellites via a secure military gateway located in Hawaii, USA.

The LEO space vehicles 104 receive the uplink of the GPS correction data 118 at Event 8, and at Event 9, determine a subset of spot beams to use for broadcasting the GPS correction data 118 to the GPS user equipment 110. Because the LEO space vehicles 104 are primarily used to broadcast data other than the GPS correction data 118 to earth, embodiments disclosed herein utilize only a subset of the spot beams used to transmit data for the transmission of the GPS correction data 118. Moreover, the type of broadcast message must be selected to most efficiently utilize the bandwidth of the LEO space vehicles 104 to provide a spot beam footprint on the earth that maximizes a contiguous swath width of coverage for transmitting the GPS correction data 118 without interfering with the primary telecommunication broadcast responsibilities of the LEO space vehicles 104. The determination of the message type and spot beam subset to utilize for transmitting the GPS correction data 118 to the GPS user equipment 110 will be discussed in further detail below with respect to FIGS. 3-7. It should be understood that these determinations may be made by the GPS augmentation engine 114 aboard the LEO space vehicles 104, at the LEO ground segment 108, or a combination of both.

At Event 10, the LEO space vehicles 104 broadcast the GPS correction data 118 via the selected subset of spot beams to the earth. The GPS user equipment 110 receives the GPS correction data 118 at Event 11. At Event 12, the GPS user equipment 110 receives the GPS data 116 from the GPS space vehicles 102. As stated above, receiving the GPS data 116 from the GPS space vehicles 102 may occur before, concurrently with, or after receiving the GPS correction data 118 from the LEO space vehicles 104. The GPS user equipment 110 applies the GPS correction data 118 to the GPS data 116 to determine the position and clock bias associated with the applicable GPS space vehicles 102 and to subsequently determine the position and other navigational data corresponding to the GPS user equipment 110 at Events 13 and 14.

Figure 3:
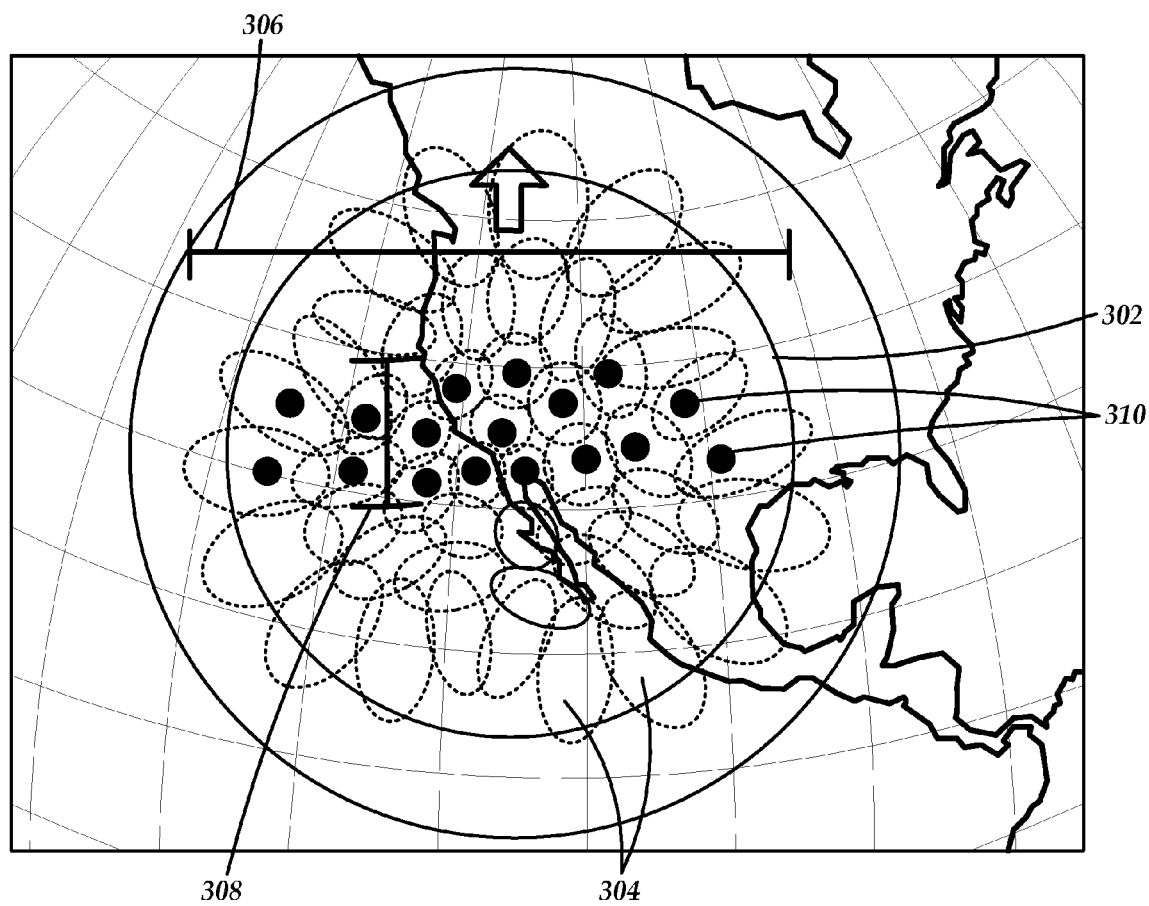
FIG. 3 is a pictorial diagram illustrating representations of transmission spot beam footprints on the earth and a selected subset of spot beams corresponding to a LEO satellite of a GPS augmentation system according to various embodiments presented herein.

FIG. 3 shows a pictorial diagram that shows an illustrative broadcast footprint 302 of a single LEO space vehicle 104 as it passes from pole to pole over a portion of North America. According to one embodiment, an IRIDIUM space vehicle broadcasts data on 48 overlapping spot beams 304 to create the approximate broadcast footprint 302. Due to bandwidth constraints of the LEO space vehicles 104, it is not practical, and may not be possible, to broadcast the GPS correction data 118 over all 48 spot beams. Therefore, a subset of spot beams 310 is selected by the GPS augmentation engine 114 to use for broadcasting the GPS correction data 118 to earth. In choosing the subset of spot beams 310, an effort may be made to maximize the contiguous swath width 306 and control the necessary swath depth 308. Spot beams 304 are chosen across the diameter of the broadcast footprint 302 to maximize the contiguous swath width 306 and ensure transmission of the GPS correction data 118 across the largest possible ground area. The swath depth 308 should include only the number of spot beams 310 necessary to ensure that user equipment at a fixed point on the ground will receive the message from the LEO space vehicle 104 for an adequate period of time. In choosing the spot beams 304 to create the desired swath depth, the angular velocity of the LEO space vehicles 104 and the estimated message latency will be used, as described in detail below.

The example shown in FIG. 3 shows a subset of spot beams 310 that includes 17 spot beams 304 from the total 48 spot beams 304 available for transmission by the LEO space vehicles 104. These 17 spot beams 304 that make up the subset of spot beams 310 overlap across the entire diameter of the broadcast footprint 302, ensuring that the GPS correction data 118 is broadcast over the largest possible swath width 306 of the LEO space vehicles 104. As stated above, the swath depth 308 is chosen according to the desired length of time for the transmission of the GPS correction data 118 to a particular fixed location within the broadcast footprint, taking into account the angular velocity of the LEO space vehicle 104 and the message latency corresponding to the amount of time it takes to broadcast the entire message containing the GPS correction data 118 to the earth.

For example, the 17 spot beams 304 chosen for inclusion within the subset of spot beams 310 covers a swath depth 308 of approximately 10 degrees. According to one embodiment, the LEO space vehicle 104 is an IRIDIUM satellite having an angular velocity of approximately 16.7 seconds/degree.

Therefore, it will take approximately 167 seconds to travel 10 degrees. GPS user equipment 110 within the broadcast footprint of the subset of spot beams 302 will be able to receive and demodulate any GPS correction data 118 for approximately 170 seconds (16.7 seconds/degree×10 degrees). According to this embodiment, because approximately 170 seconds is determined to be adequate for broadcasting the GPS correction data 118 according to the predicted message sizes, 17 spot beams 304 that span the broadcast footprint 302 and create a 10 degree swath depth were selected as shown in FIG. 3 as the subset of spot beams 310 to broadcast the GPS correction data 118 to earth. The determination of the latency associated with broadcasting a message containing the GPS correction data 118 will be described in detail below with respect to FIG. 5.

Figure 4:
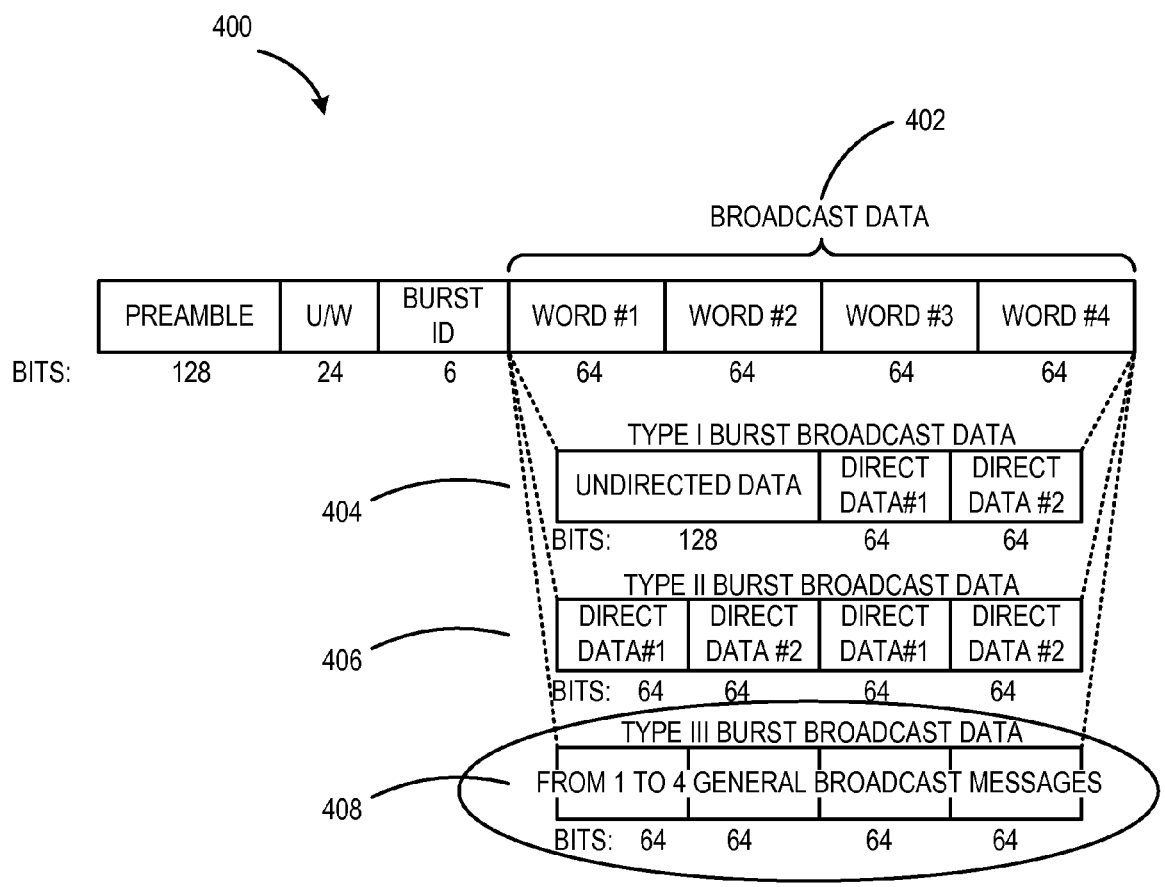
FIG. 4 is a block diagram illustrating a broadcast channel architecture associated with a LEO satellite spot beam transmission according to various embodiments presented herein.

Turning now to FIG. 4, broadcast channel architecture 400 for broadcasting within a spot beam 304 of a LEO space vehicle 104 according to various embodiments presented herein will be described. The broadcast includes broadcast data 402, which may be the GPS correction data 118. According to the embodiment shown in which the LEO space vehicles 104 are IRIDIUM space vehicles, the architecture associated with the broadcast data 402 varies according to the burst type utilized for broadcasting data to earth. Type I burst broadcast data 404 may contain one undirected broadcast message and up to two directed broadcast messages. Type II burst broadcast data 406 may contain up to four directed broadcast messages. Type III burst broadcast data 408 may contain up to four general broadcast message words, totaling 256 bits of data.

According to one embodiment utilizing IRIDIUM space vehicles, the GPS correction data 118 is broadcast to the earth within Type III burst broadcast data since Type III is less often utilized by the LEO space vehicles 104 and does not have a 100% duty cycle. These characteristics allow for the GPS correction data 118 to be transmitted on the subset of spot beams 310 without degrading the performance of the LEO space vehicles 104 with regard to their primary telecommunications duties. It should be appreciated that other types of broadcast bursts may also be utilized within the scope of the present disclosure. Selecting the type of broadcast architecture and the number of spot beams 304 within the subset of spot beams 310 is accomplished with an attempt to utilize minimum LEO constellation resources to broadcast the GPS correction data 118 over the largest possible contiguous swath width 306 for an adequate period of time to allow the GPS user equipment 110 to receive up-to-date GPS correction data 118 for use in determining position and other navigational information.

Figure 5:
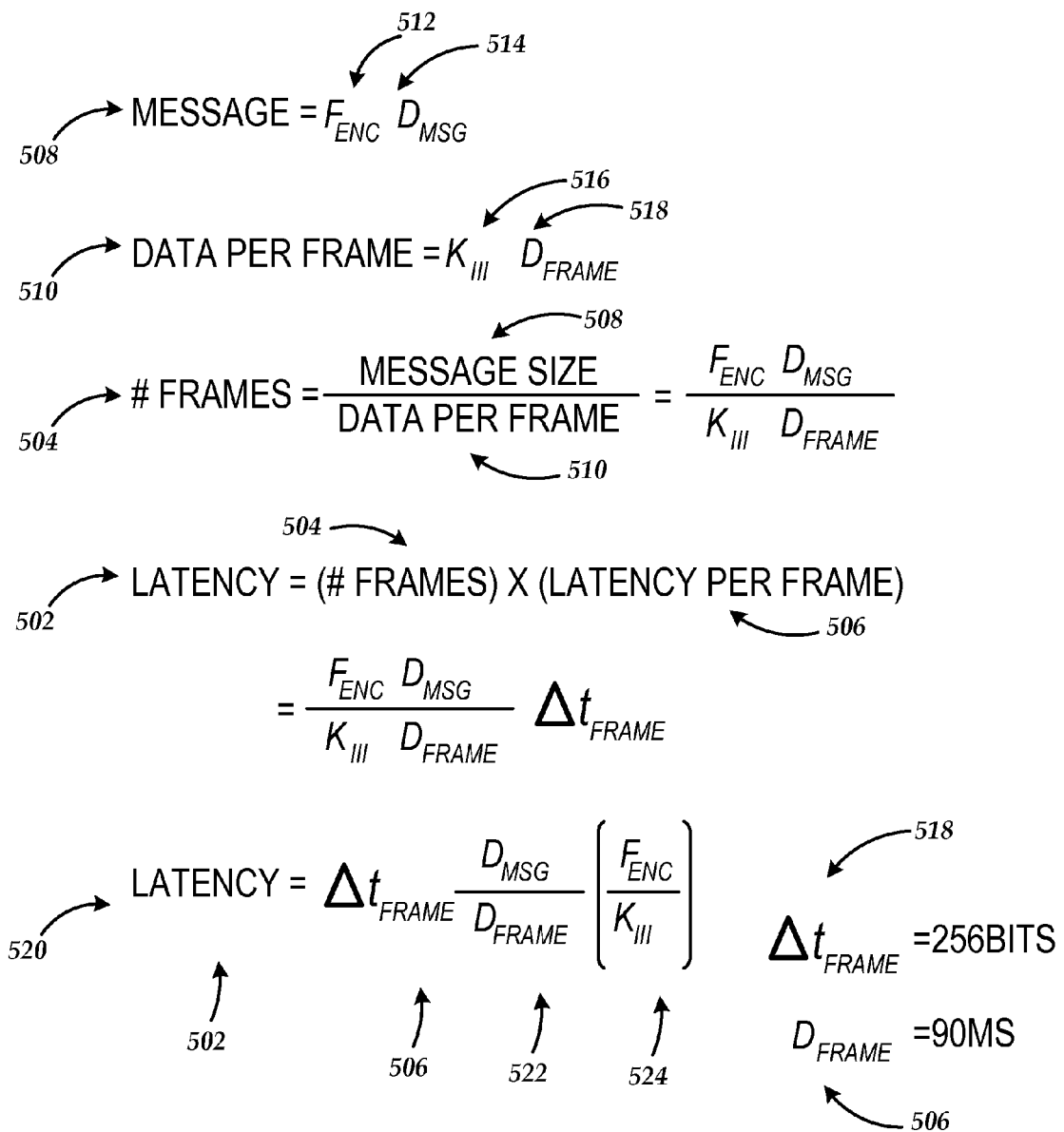
FIG. 5 is a diagram illustrating LEO spot beam latency estimate calculations according to various embodiments presented herein.

FIG. 5 illustrates sample calculations for determining the message latency 502 for a Type III broadcast, which is the amount of time required to transmit the message containing the GPS correction data 118. The message latency 502 is equivalent to the number of frames 504 in the message times the frame latency 506, which is the amount of time required to transmit one frame of the message containing the GPS correction data 118. According to one embodiment utilizing the IRIDIUM space vehicles, the frame latency 506 is equivalent to approximately 90 milliseconds (ms). The number of frames 504 is shown to be equivalent to the encoded message size 508 divided by the data per frame 510. The encoded message size 508 is equivalent to the non-encoded message size 514 multiplied by an inflation factor, $F_{enc}$, 512. The inflation factor 512 is a multiple that is greater than one that estimates the increase in the non-encoded message size 514 that will result from encoding the message.

The data per frame 510 is equivalent to the frame size 518 multiplied by a duty cycle factor, $k_{III}$, 516. The duty cycle factor 516 is a number between zero and one that represents the estimated duty cycle corresponding to a selected broadcast burst type. The resulting latency formula 520 for determining the message latency 502 can be viewed as equivalent to the frame latency 506 multiplied by a size factor 522, which is equivalent to the non-encoded message size 514 divided by the frame size 518, multiplied by a variable 524 that is equivalent to the inflation factor 512 divided by the duty cycle factor 516. A graph 600 that plots the variable 524 versus the message latency 502 for two different non-encoded message sizes 514 is shown in FIG. 6.

Figure 6:
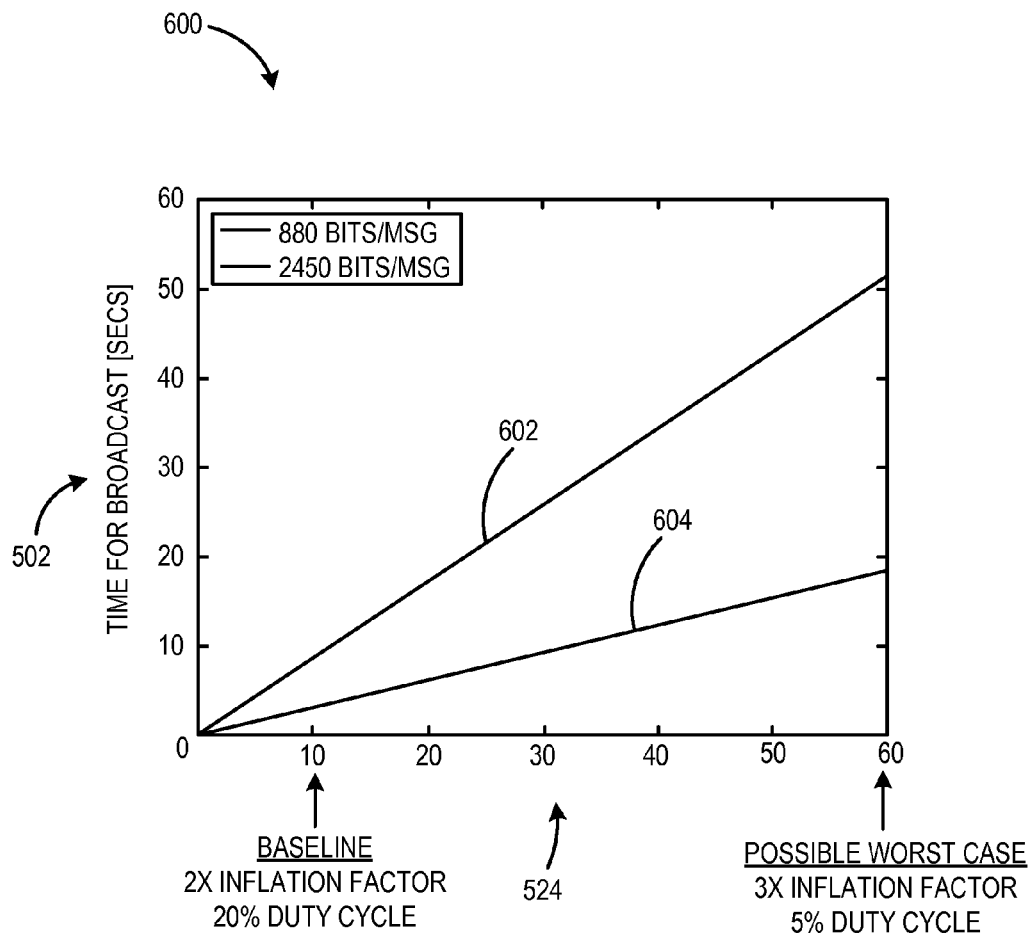
FIG. 6 is a chart illustrating the effects of various LEO spot beam message factors on the latency associated with two different illustrative sizes of correction messages according to various embodiments presented herein.

Looking at FIG. 6, the graph 600 shows the variable 524 along the x-axis and the message latency 502 along the y-axis. It can be seen that as the variable 524 increases, the message latency 502 increases. In other words, the shorter the duty cycle and/or the larger the inflation factor 512, then the longer the required amount of time will be to broadcast the message that includes the GPS correction data 118. Two sample non-encoded message sizes 514 are plotted on the graph 600, a 2,450 bit message 602 and an 880 bit message 604. These two sample message sizes 514 are representative of a high data rate message option that utilizes cycle redundancy check code and clock and ephemeris correction data and a low data rate message option that utilizes parity check code and clock only correction data. To determine a baseline estimate of the message latency 502 for the 2,450 bit message 602, reasonable assumptions of a 2× inflation factor 512 and a 20% duty cycle factor 516 may be used. Using the latency formula 520 shown in FIG. 5, with a frame latency 506 of 90 ms and a frame size 518 of 256 bits, the message latency 502 is determined to be approximately 8.6 seconds: (90 ms)×(2,450 bits/256 bits)×(2/0.2)=8.6 seconds.

Looking at the graph 600, it can be seen that if the inflation factor 512 is 3× and the duty cycle is only 5%, then the message latency 502 corresponding to the 2,450 bit message is approximately 51.7 seconds, which is still well within the approximately 170 second window provided by choosing 17 spot beams 304 in the subset of spot beams 310 in FIG. 3. It should be apparent that the GPS augmentation engine 114 may choose a subset of spot beams 310 for the LEO space vehicles 104 according to the message size, and available or desired duty cycle of the corresponding communication message burst type used. Moreover, the message latency 502 may also be controlled by shortening the non-encoded message size 514 if the required bandwidth is not available or other factors require doing so. Shortening the message size may be accomplished by reducing the size of the GPS correction data 118, which would reduce the accuracy of the resultant navigational data calculated by the GPS user equipment 110.

Using the IRIDIUM satellite constellation as the LEO space vehicles 104, embodiments described herein improve the accuracy of the navigation solutions calculated by the GPS user equipment 110. According to various embodiments, if the age of data (AoD) of the GPS correction data 118 is less than one hour from the time that it is calculated until receipt by the GPS user equipment 110, then the nominal accuracy of the resulting navigation solutions may be approximately 1.62 m (2-σ) range, with a user differential range error (UDRE) of approximately 0.29 m (1-σ) and a user equipment error (UEE) of approximately 0.75 m (1-σ). Additionally, the horizontal accuracy of the navigation solution providing a position, velocity, and time estimate is approximately 2.35 m (2-σ), with the vertical accuracy being approximately 4.15 m (2-σ). It should be appreciated that the disclosure herein is not limited to these accuracy and error results, which are provided as examples of improvements over conventional GPS technologies.

Figure 7:
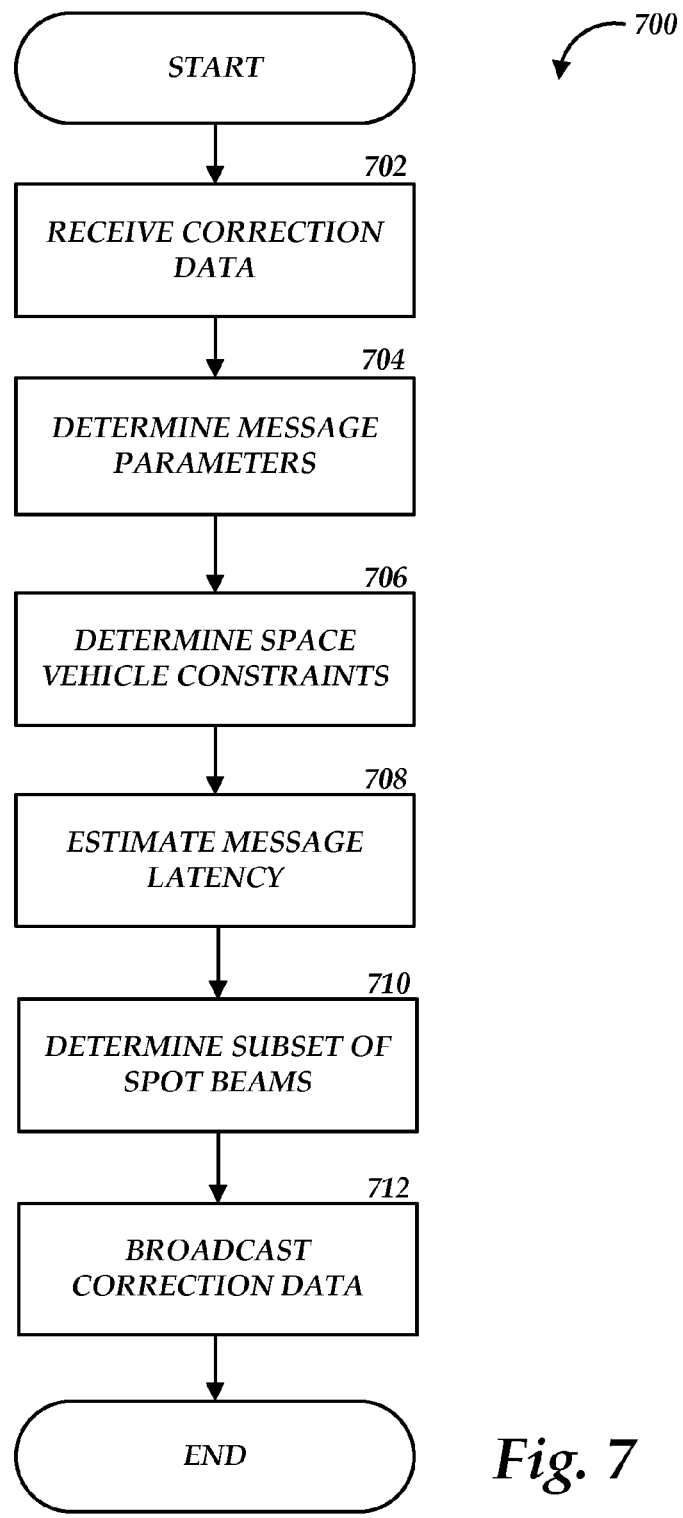
FIG. 7 is a flow diagram illustrating a method for providing GPS correction data according to various embodiments presented herein.

Turning now to FIG. 7, an illustrative routine 700 will be described for augmenting GPS data 116 to enhance the accuracy of corresponding navigation solutions according to various embodiments presented herein. The routine 700 will be described with respect to the GPS augmentation system 100 shown in FIG. 1. It should be appreciated that the logical operations described herein are implemented (1) as a sequence of computer implemented acts or program modules running on any of the elements of the GPS augmentation system 100 and/or (2) as interconnected machine logic circuits or circuit modules within any of the elements of the GPS augmentation system 100. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 700 begins at operation 702, where the GPS augmentation engine 114 receives the GPS correction data 118 from the GPS control segment 106. As described above, according to alternative embodiments, the LEO ground segment 108 may calculate the GPS correction data 118 instead of the GPS control segment 106. In these alternative embodiments, the LEO ground segment 108 may receive the GPS data 116 from the GPS control segment 106 or directly from the GPS space vehicles 102. From operation 702, the routine 700 continues to operation 704, where the GPS augmentation engine 114 determines the communication message parameters for transmitting the GPS correction data 118. The communication message parameters may include the information required to determine the message latency 502, such as the non-encoded message size 514 and the inflation factor 512.

Other information needed to calculate the message latency 502 is determined at operation 706, where the GPS augmentation engine 114 determines the constraints associated with the LEO space vehicles 104. For example, the GPS augmentation engine 114 may calculate or retrieve the angular velocity to be used in determining the subset of spot beams 310 according to the message latency 502, retrieve or query for the bandwidth constraints of the LEO space vehicles 104 according to their current operational status, which may include data regarding the communication message types in use by the LEO space vehicles 104.

From operation 706, the routine 700 continues to operation 708, where the GPS augmentation engine 114 estimates the message latency 502 utilizing the determined communication message parameters and the constraints associated with the LEO space vehicles 104. This estimation may be made using the formula 520 shown in FIG. 5 as described above. The routine 700 continues from operation 708 to operation 710, where the GPS augmentation engine 114 determines the subset of spot beams 310 to use to broadcast the GPS correction data 118 to the earth. According to various embodiments, the subset of spot beams 310 may be selected to maximize the contiguous swath width of the LEO space vehicles 104, while minimizing the impact on other telecommunications broadcasts, as shown and described above with respect to FIG. 3. From operation 710, the routine 700 continues to operation 712, where the GPS correction data 118 is broadcast over the subset of spot beams 310 to the GPS user equipment 110.

Figure 8:
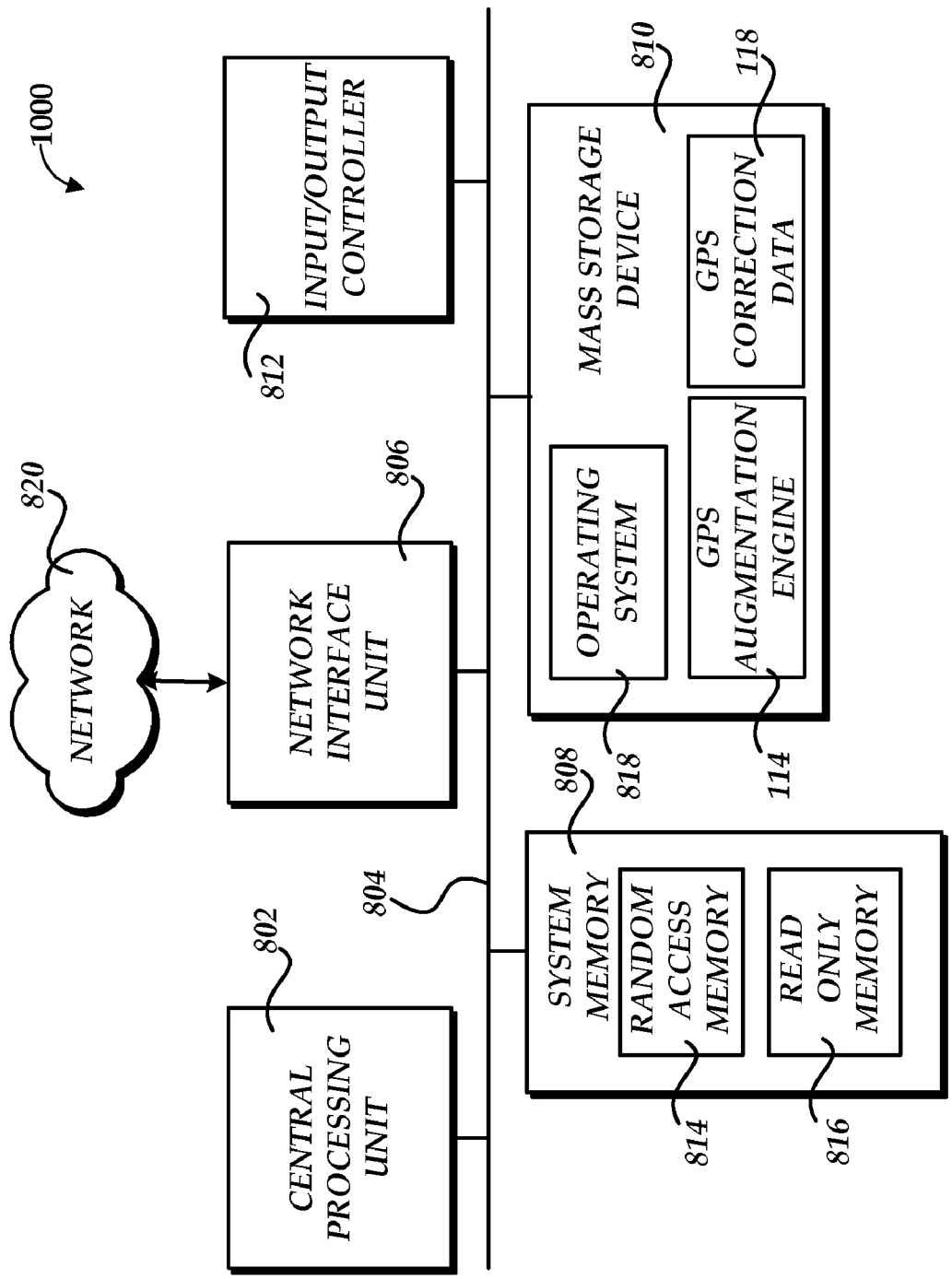
FIG. 8 is a computer architecture diagram showing a computer architecture suitable for implementing the various computer systems described herein.

Referring now to FIG. 8, an illustrative computer architecture for a computing device containing the GPS augmentation engine 114 utilized in the various embodiments presented herein will be discussed. As previously stated, the GPS augmentation engine 114 may reside at the LEO ground segment 108, at the LEO space vehicle 104, or a combination thereof. The computer architecture shown in FIG. 8 may illustrate a conventional desktop, laptop computer, or server computer. The computer architecture shown in FIG. 8 includes a central processing unit 802 (CPU), a system memory 808, including a random access memory (RAM) 814 and a read-only memory (ROM) 816, and a system bus 804 that couples the memory to the CPU 802. A basic input/output system (BIOS) containing the basic routines that help to transfer information between elements within the computing device, such as during startup, is stored in the ROM 816. The computing device further includes a mass storage device 810 for storing an operating system 818, application programs, and other program modules, which will be described in greater detail below.

The mass storage device 810 is connected to the CPU 802 through a mass storage controller (not shown) connected to the bus 804. The mass storage device 810 and its associated computer-readable media provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the GPS augmentation engine 114.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the GPS augmentation engine 114.

According to various embodiments, the computing device containing the GPS augmentation engine 114 may operate in a networked environment using logical connections to remote computers through a network 820. The network 820 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. The network 820 may also be a wired network such as, but not limited to, a wired Wide Area Network (WAN), a wired Local Area Network (LAN) such as the Ethernet, a wired Personal Area Network (PAN), or a wired Metropolitan Area Network (MAN). The network 820 may also include the Internet such that the network communications occur via wireless or wired connections to the Internet.

The computing device may connect to the network 820 through a network interface unit 806 connected to the bus 804. It should be appreciated that the network interface unit 806 may also be utilized to connect to other types of networks and remote computer systems. The computing device may also include an input/output controller 812 for receiving and processing input from a number of other devices, including a keyboard, mouse, or electronic stylus (not shown in FIG. 8).

Similarly, an input/output controller may provide output to a display screen, a printer, or other type of output device (also not shown in FIG. 8).

As mentioned briefly above, a number of program modules and data files may be stored in the mass storage device 810 and RAM 814 of the computing device, including the operating system 818 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 810 and RAM 814 may also store one or more program modules. In particular, the mass storage device 810 and the RAM 814 may store the GPS augmentation engine 114, the GPS correction data 118, the GPS data 116, as well as any other program modules described above with respect to FIG. 1. Based on the foregoing, it should be appreciated that apparatus, systems, methods, and computer-readable media for augmenting the GPS to enhance accuracy are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing global positioning system (GPS) correction data to user equipment, the method comprising:
   receiving GPS correction data;
   determining a subset of spot beams corresponding to a low earth orbiting (LEO) satellite of a plurality of LEO satellites, such that a footprint of the subset of spot beams maximizes a contiguous swath width of the LEO satellite; and
   broadcasting the GPS correction data in the subset of spot beams to the earth.

2. The method of claim 1, wherein receiving the GPS correction data comprises receiving the GPS correction data at a ground segment associated with the plurality of LEO satellites, and wherein The method further comprises uploading the GPS correction data to the LEO satellite from the ground segment.

3. The method of claim 2, wherein the ground segment comprises a secure ground gateway for uploading the GPS correction data.

4. The method of claim 1, further comprising determining GPS correction data at a control segment associated with a plurality of GPS satellites, the GPS correction data comprising at least clock and ephemeris correction data.

5. The method of claim 1, wherein receiving the GPS correction data occurs at least every 15 minutes.

6. The method of claim 1, further comprising estimating the message latency associated with broadcasting the GPS correction data, wherein determining the subset of spot beams corresponding to the LEO satellite comprises determining the subset of spot beams according to an angular velocity of the LEO satellite and the estimated message latency.

7. The method of claim 6, wherein estimating the message latency comprises multiplying a frame latency value and a size proportion value and a variable, wherein the frame latency value comprises an amount of time required to transmit one frame of a message containing the GPS correction data, wherein the size proportion value comprises a ratio of a size of the message when not encoded to a size of one frame of the message, and wherein the variable comprises a ratio of an inflation factor corresponding to an increase in the size of the message after encoding to a duty cycle factor corresponding to an estimated duty cycle for a communication message burst type to be used for broadcasting the message containing the GPS correction data.

8. The method of claim 1, further comprising:
   analyzing current communication message burst types associated with the LEO satellite to determine current bandwidth constraints for broadcasting the GPS correction data; and
   selecting a communication message burst type for broadcasting the GPS correction data according to the current bandwidth constraints,
   wherein broadcasting the GPS correction data in the subset of spot beams to the earth comprises broadcasting the GPS correction data in the subset of spot beams to the earth utilizing the selected communication message burst type.

9. The method of claim 8, wherein the LEO satellite is operative to perform a primary function that is not broadcasting the GPS correction data, and wherein selecting the communication message burst type for broadcasting the GPS correction data according to the current bandwidth constraints comprises selecting the communication message burst type having characteristics that best enables the performance of the primary function.

10. The method of claim 9, wherein the plurality of LEO satellites comprises a plurality of IRIDIUM satellites, and wherein selecting the communication message burst type having characteristics that best enables the performance of the primary function comprises selecting a Type III burst communication message.

11. A system for providing GPS correction data to user equipment comprising:
   a memory for storing a program containing code for providing GPS correction data to user equipment; and
   a processor functionally coupled to the memory, the processor being responsive to computer-executable instructions contained in the program and operative to:
   receive GPS correction data;
   determine a subset of spot beams corresponding to a LEO satellite of a plurality of LEO satellites, such that a footprint of the subset of spot beams maximizes a contiguous swath width of the LEO satellite; and
   broadcast the GPS correction data in the subset of spot beams to the earth.

12. The system of claim 11, wherein the memory and the processor reside within the LEO satellite, and wherein the GPS correction data is received from a ground segment associated with the plurality of LEO satellites.

13. The system of claim 11, wherein the processor is further operative to estimate the message latency associated with broadcasting the GPS correction data, and wherein determining the subset of spot beams corresponding to the LEO satellite comprises determining the subset of spot beams according to an angular velocity of the LEO satellite and the estimated message latency.

14. The system of claim 13, wherein estimating the message latency comprises multiplying a frame latency value and a size proportion value and a variable, wherein the frame latency value comprises an amount of time required to transmit one frame of a message containing the GPS correction data, wherein the size proportion value comprises a ratio of a size of the message when not encoded to a size of one frame of the message, and wherein the variable comprises a ratio of an inflation factor corresponding to an increase in the size of the message after encoding to a duty cycle factor corresponding to an estimated duty cycle for a communication message burst type to be used for broadcasting the message containing the GPS correction data.

15. The system of claim 11, wherein the processor is further operative to:
   analyze current communication message burst types associated with the LEO satellite to determine current bandwidth constraints for broadcasting the GPS correction data; and
   select a communication message burst type for broadcasting the GPS correction data according to the current bandwidth constraints,
   wherein broadcasting the GPS correction data in the subset of spot beams to the earth comprises broadcasting the GPS correction data in the subset of spot beams to the earth utilizing the selected communication message burst type.

16. A system for providing UPS correction data to user equipment, comprising:
   a ground segment operative to
      receive GPS correction data, and
      upload the GPS correction data to a plurality of LEO satellites; and
   a plurality of LEO satellites, each LEO satellite operative to
      receive the upload of the GPS correction data,
      determine a subset of spot beams for broadcasting the GPS correction data to the earth, and
      broadcast the UPS correction data in the subset of spot beams to the earth for receipt and use by the user equipment.

17. The system of claim 16, further comprising a GPS control segment operative to:
   receive uncorrected GPS data from a plurality of G satellites;
   create the UPS correction data from the uncorrected GPS data; and
   transmit the GPS correction data to the ground segment.

18. The system of claim 16, wherein each LEO satellite is further operative to estimate the message latency associated with broadcasting the UPS correction data, and wherein determining the subset of spot beams for broadcasting the UPS correction data to the earth comprises determining the subset of spot beams according to an angular velocity of the LEO satellite and the estimated message latency.

19. The system of claim 18, wherein estimating the message latency comprises multiplying a frame latency value and a size proportion value and a variable, wherein the frame latency value comprises an amount of time required to transmit one frame of a message containing the GPS correction data, wherein the size proportion value comprises a ratio of a size of the message when not encoded to a size of one frame of the message, and wherein the variable comprises a ratio of an inflation factor corresponding to an increase in the size of the message after encoding to a duty cycle factor corresponding to an estimated duty cycle for a communication message burst type to be used for broadcasting the message containing the GPS correction data.

20. The system of claim 16, wherein each LEO satellite is further operative to:
   analyze current communication message burst types associated with the LEO satellite to determine current bandwidth constraints for broadcasting the GPS correction data; and
   select a communication message burst type for broadcasting the GPS correction data according to the current bandwidth constraints,
   wherein broadcasting the GPS correction data in the subset of spot beams to the earth comprises broadcasting the GPS correction data in the subset of spot beams to the earth utilizing the selected communication message burst type.

* * * * *

UNITED STATES PATENT AND TRADEMARK OFFICE
CERTIFICATE OF CORRECTION

PATENT NO. : 7,969,352 B2
APPLICATION NO. : 12/341158
DATED : June 28, 2011
INVENTOR(S) : James A. DiLellio et al.

It is certified that error appears in the above-identified patent and that said Letters Patent is hereby corrected as shown below:

Cover Page, Line (75) Inventors: the portion reading "Kamran Ghassaei, Orange CA (US)" should be changed to --Kamran Ghassemi, Orange, CA (US)--

Signed and Sealed this
Twenty-eighth Day of February, 2012

David J. Kappos
*Director of the United States Patent and Trademark Office*